United States Patent [19]

Shigematsu

[11] 4,281,978
[45] Aug. 4, 1981

[54] SURFACE COATING DEVICE OF CORE BODY

[75] Inventor: Shozo Shigematsu, Habikino, Japan

[73] Assignee: Kabushiki Gaisha Mitokako, Osaka, Japan

[21] Appl. No.: 124,000

[22] Filed: Feb. 25, 1980

[51] Int. Cl.³ .............................................. B29F 3/10
[52] U.S. Cl. ................................ 425/376 B; 118/405; 264/167; 264/310; 425/113; 425/381; 425/465
[58] Field of Search ........... 425/465, 466, 381, 376 B, 425/376 R, 113; 264/310, 312, 167; 118/404–405

[56] References Cited

U.S. PATENT DOCUMENTS

| | | | |
|---|---|---|---|
| 3,193,604 | 7/1965 | Mercer | 264/167 |
| 3,249,668 | 5/1966 | Scragg et al. | 425/376 B |
| 3,422,648 | 1/1969 | Lemelson | 425/465 |
| 3,496,605 | 2/1970 | Onaka | 264/312 |
| 3,642,396 | 2/1972 | Meneidis | 264/173 |
| 3,666,389 | 5/1972 | Nelson | 264/312 |
| 3,928,519 | 12/1975 | Kashiyama et al. | 264/167 |
| 4,053,274 | 10/1977 | Lemelson | 425/381 |

Primary Examiner—Jeffery R. Thurlow
Attorney, Agent, or Firm—Larson and Taylor

[57] ABSTRACT

A coating device for the coating of synthetic resin in a given thickness on the outer surface of a core body. An elongate body made of metallic tube or the like passes through an extrusion chamber and out of an opening in the chamber. A moveable die is held, rotatable freely, between said chamber and a fixed die provided in alignment with the opening of said chamber. The fixed and moveable dies are provided respectively with an optional number of grooves in the forward direction of the elongate body on their inner walls, with respective grooves being alignable with each other. By giving a fixed rotation to the moveable die, the supply and non-supply of synthetic resin to the grooves of the fixed die will repeat. Thus, the surface of the body is coated with synthetic resin and, at the same time, there are formed on the surface of the coated resin a plurality of projections in a discontinuous form.

11 Claims, 6 Drawing Figures

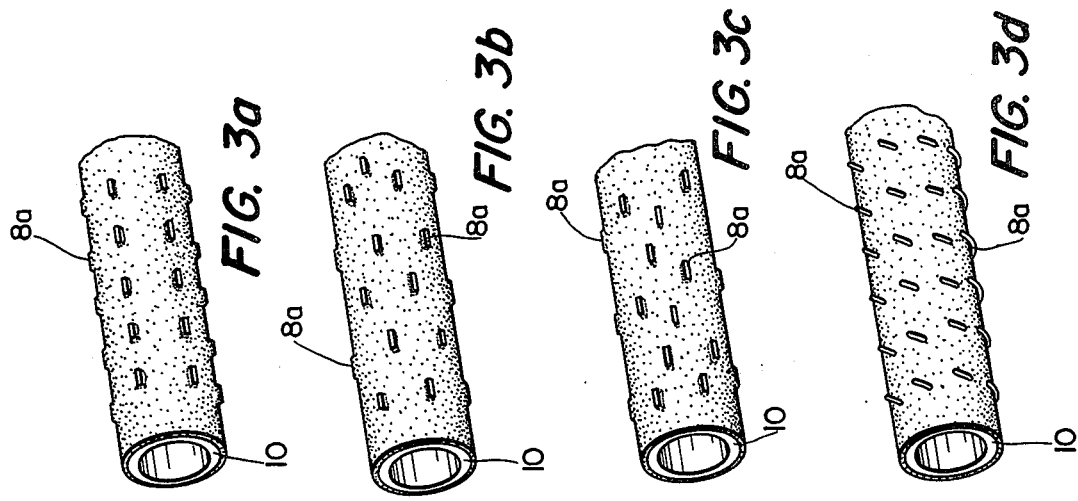
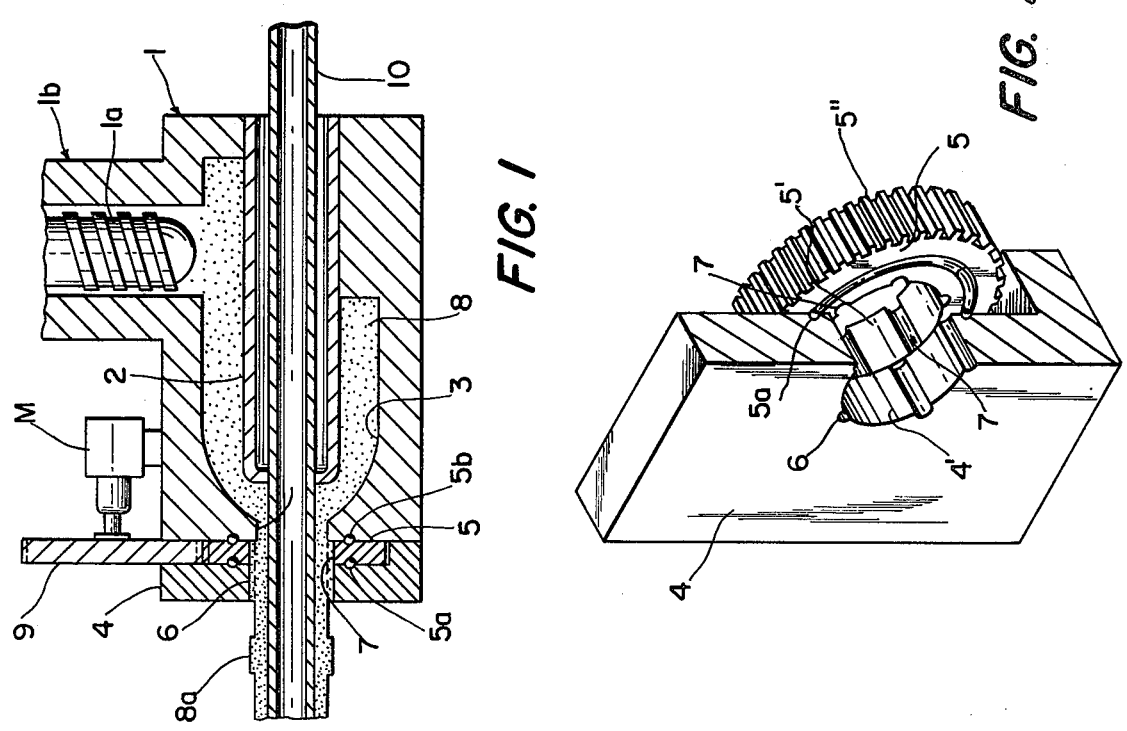

SURFACE COATING DEVICE OF CORE BODY

This invention relates to a surface coating device wherein the surface of a body is coated with plastic synthetic resin, e.g. polyvinyl chloride to a given thickness and, in addition, a plurality of discontinuous projections of the coating resin are formed all over the surface.

Of the stays or posts that are used for agricultural or marine purposes, those made of a metallic tube with its surface being coated by synthetic resin for the purpose of rust prevention have become extensively used nowadays in lieu of those made of natural tree branches or bamboo which are apt to get rotten fast. However, the surface of a post coated with synthetic resin by an ordinary extruding machine is slippery. When a rope or the like is tied to the post, it easily moves out of position. In order to solve this problem, the surface, after being coated with said synthetic resin, must further be made uneven. To do this, a method as described next has conventionally been pursed. The conventional way has been that by the use of an adequate extruding machine, the surface of the body is coated with plastic synthetic resin and, at the same time, several continuous projection lines are formed all over the surface in the axial direction of the elongate body. Then, before the coated synthetic resin is hardened, the projection lines are pressed or cut off at a given distance by proper means to form secondary discontinuous projection portions. The aforesaid method, however, has been proved defective as it invites a high production cost resulting from a complicated manufacturing process, extra labor and excessive waste of synthetic resin.

One of the prime objects of the present invention is to provide a surface coating device enabling the coating of the surface of a body with synthetic resin and, at the same time, by repeating the operation of supply and nonsupply of said synthetic resin to the grooved portion of dies affixed on the tip of the coating device main body, to form a plurality of discontinuous projections simultaneously with said coating resin.

Another object of the present invention is to provide a device permitting change, within an adequate range, of the disposition of the discontinuous projections.

Still another object of the present invention is to provide a surface coating device having a high production efficiency which minimizes the consumption of synthetic resin to turn out economically posts, stays, and the like having the aforesaid structure.

The primary and other pertinent objects and the characteristics of the present invention enumerated above are undoubtedly clear in view of the description which follows and also in view of the drawings attached hereto relating to the present invention.

FIG. 1 is a vertical section of the central part of a coating device in accordance with the present invention.

FIG. 2 is a perspective, particaly sectional, view of the device of FIG. 1 showing grooves of the fixed die out of alignment with grooves of the moveable die.

FIGS. 1(a) to 3(d) are perspective views of pipes coated with synthetic resin and provided with projections, in various patterns, in accordance with the invention.

The embodiments of the present invention will be explained with reference to accompanying drawings.

As shown in FIG. 1, the main body (1) of the device has a screw (1a) inside a cylinder (1b) to force resin into resin chamber (3) having a nozzle (2) therein. On the outer side of an opening (3a) of said chamber (3) a fixed die (4) is affixed. Between said chamber (3) and fixed die (4) a moveable die (5) is provided, rotatable freely on bearings (5a) (5b). The dies (4) (5) are provided with resin passages (4') and (5') respectively having diameters corresponding to the thickness of the coating resin and the diameter of these passages is designed to be the same as or a bit less then the diameter of the opening (3a) of the resin chamber (3).

On the inner surface of the respective resin passages (4') (5') of the two dies (4) (5) are formed, passing through to the direction of thickness, a plurality of respective grooves (6) (7) and, by the rotation of said moveable die (5), the respective grooves (6) of the fixed die (4) can be moved into alignment jointly or individually with the grooves (7) of the moveable die (5).

Moveable die (5) in the present embodiments, has at its outer circumference a toothed portion (5") and is rotatable freely, at a given speed, by means of motor (M) through driving gear (9). Other types of rotating means may be utilized.

(10) represents a core body comprising a metallic tube or the like. In the present invention an elongate body (10) made of iron tube or the like is inserted through nozzle (2). Synthetic resin (8) is fed under a given pressure from the pushing-out cylinder (1b) into the chamber (3) and, at the same time, the moveable die (5) is rotated at a given speed through the driving gear (9) by actuating motor (M).

Under the conditions stated above, along with the passing of said core body (10) at a given speed through the chamber (3), the resin existing in the chamber (3) is led to resin passages (4') (5') of dies (4) (5) jointly with the elongate body which is extrusion-coated with resin, the coating having a given thickness depending on the diameter of the passage and the diameter of the cylindrical body.

Of the respective grooves (6) (7) of the fixed die (4) and moveable die (5), in case one or more grooves become aligned, the synthetic resin (8) is fed to the grooves (6) of the fixed die (4) so that the projection (8a) whose shape corresponds to the groove (6) of the fixed die (4) is formed on the synthetic resin coating body (10).

On the other hand, when the grooves (4') (5') of both dies (4) (5) are out of alignment due to the rotation of moveable die (5), feeding of synthetic resin (8) to the groove (7) of the fixed die (4) is stopped so that until said grooves (4) (5) are again aligned, forming of the projections (8a) on the coated resin does not take place.

In this way, simultaneously with the outer circumference of the core body (10) being coated with resin in a given thickness, supply and non-supply of said synthetic resin (8) to the groove (6) of the fixed die (4) is repeated and, as a result, the support is provided with discontinuous projections (8a) on the surface of coated resin.

The configuration of said projections (8a) on said coated resin varies in many ways in relation to the respective grooves (6) (7) of the fixed die (4) and moveable die (5). For example, when the number of grooves of said moveable die (5) is set to be an integer multiple of that of said fixed die (4) and the distance of respective grooves of both dies (4) (5) are equal, and then when the core body (10) on the coated resin goes forward at a given speed without rotating it, as shown in FIG. 3(a), the projections (8a) are arranged in lines extending in the axial direction of the body (10) in the same number as that of the grooves of the fixed die (4). Further, the projections (8a) on the respective axial lines are formed on the same circumference.

When the number of the grooves of the fixed die (4) is set at half of that of the moveable die (5) and the distance of respective grooves of both dies is constant, the projections of respective axial lines provided along the body will be arranged as illustrated in FIG. 3(b).

When the number of grooves of said dies (4) (5) and the distance of respective grooves are set unequal each other, the disposition of the projections will become random and, further, when a proper rotation is given to the core body its random tendency can be changed in various ways.

In addition to the above, in the present device, when at least the groove (5) of fixed die (4) is given an angle to the fixed direction and, at the same time, the elongate body (10) is passed through the resin passage (4') while rotating in the direction of said groove, a fixed angle can be given to said projection (8a) relative to the axial direction of elongate body (10) as illustrated in FIG. 3(d).

In the aforesaid embodiments, the supply and suspension of supply of resin to the fixed die (4) is done by rotating the moveable die (5) in a given direction. In the same manner, the projections (8a) can be formed at the same time on the coated resin by arranging to mechanically oscillate said moveable die (5) forward or backward a fixed angular distance.

While preferred embodiments of the present invention have been described with reference to the accompanying drawings, it would be apparent to those skilled in the art that various changes and modifications might be made from the teachings of the disclosure in the specification without departing from the present invention. Therefore, such modifications will apparently fall within the spirit and scope of the present invention, which is not intended to be limited to the embodiments, except by the appended claims.

What is claimed is:

1. Apparatus for providing a synthetic resin coating on an elongate cylindrical article comprising an extrusion body having an extrusion chamber and an extrusion opening, said extrusion opening and chamber being adapted to receive an elongate article to permit passage thereof through said chamber and out through said opening, said chamber being provided with synthetic resin inlet means for feeding extrudable synthetic resin to said chamber;

a fixed die mounted outside said chamber opening in fixed position relative thereto and having a fixed die orifice axially aligned with said chamber opening for permitting passage of said elongate article therethrough, said die orifice being sized to provide an extruded resin coating on said elongate article and being provided along its length with a plurality of grooves in its surface extending from one end to the other of said die orifice; and a moveable die mounted between said chamber opening and said fixed die, and having a moveable die orifice axially aligned with said chamber opening and said fixed die orifice permitting passage of said elongate article therethrough, said moveable die orifice being sized to provide an extruded resin coating on said elongate article and being provided along its length with a plurality of grooves in its surface extending from one end to the other of said moveable die orifice and which, upon rotation of said moveable die, can be brought into and out of alignment with the grooves in said fixed die;

said grooves in said moveable die orifice surface being in flow communication with said extrusion chamber whereby resin in said extrusion chamber flow thereinto;

whereby, when said grooves in said moveable die orifice surface are in alignment with said grooves in said fixed die orifice surface, said resin will flow into the grooves in said fixed die orifice surface and thus form a plurality of projections of resin spaced circumferentially about the resin coating extruded onto an elongate article passing through said die orifices;

and whereby, when said grooves in said moveable die orifice surface are out of alignment with said grooves on said fixed die orifice surfaces, said resin will not flow into the grooves in said fixed die orifice surface thus interrupting the formation of said resin projections.

2. Apparatus according to claim 1 further comprising means for moving said moveable die member.

3. Apparatus according to claim 1 wherein said elongate article is cylindrical, wherein said extrusion opening and die orifices are circular, and wherein the diameters of said die orifices are the same.

4. Apparatus according to claim 1 wherein the diameter of said extrusion opening is slightly larger than that of said die orifices.

5. Apparatus according to claim 1 wherein grooves extend parallel to the axes of said die orifices.

6. Apparatus according to claim 1 wherein the grooves in said fixed die orifice surface are disposed at an angle to the axis of said fixed die orifice.

7. Apparatus according to claim 1 wherein the number of grooves in said moveable die orifice surface is equal to an integer multiple of number of grooves in said fixed die orifice surface and wherein the circumferential spacing of said grooves of each die is constant.

8. Apparatus according to claim 1 wherein the number of grooves in said fixed die surface is one half the number of grooves in said moveable die orifice surface and wherein the circumferential spacing of said grooves of each die is constant.

9. Apparatus according to claim 1 wherein the number of grooves and the circumferential spacing thereof of each die is different.

10. Apparatus according to claim 2 wherein said moving means comprises means for rotating said moveable die member.

11. Apparatus according to claim 2 wherein said moving means comprises means for oscillating said moveable die member.

* * * * *